March 19, 1957  H. S. YOUNGQUIST ET AL  2,785,498
WEEDLESS ATTACHMENT
Filed July 2, 1953  2 Sheets-Sheet 1
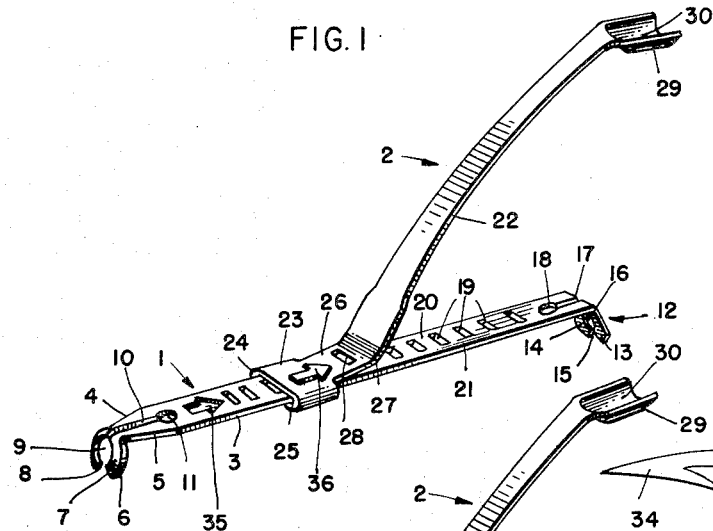
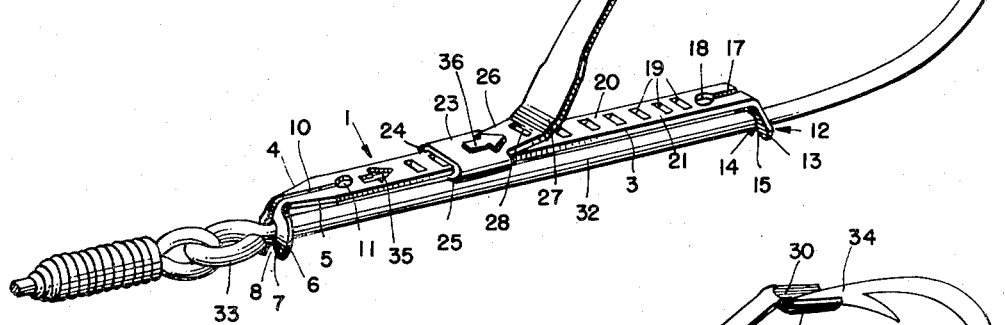
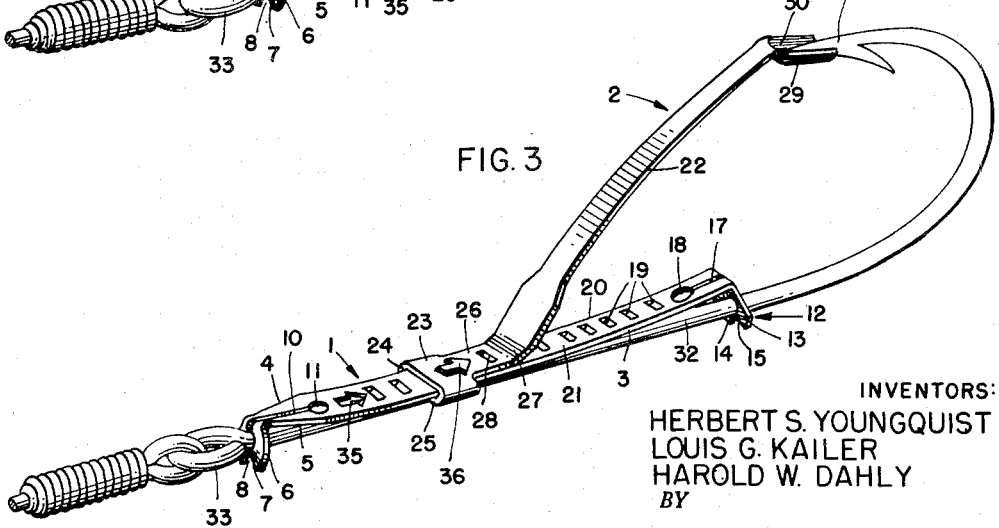
INVENTORS:
HERBERT S. YOUNGQUIST
LOUIS G. KAILER
HAROLD W. DAHLY
BY
Maryall, Johnston, Cook & Root
ATT'YS

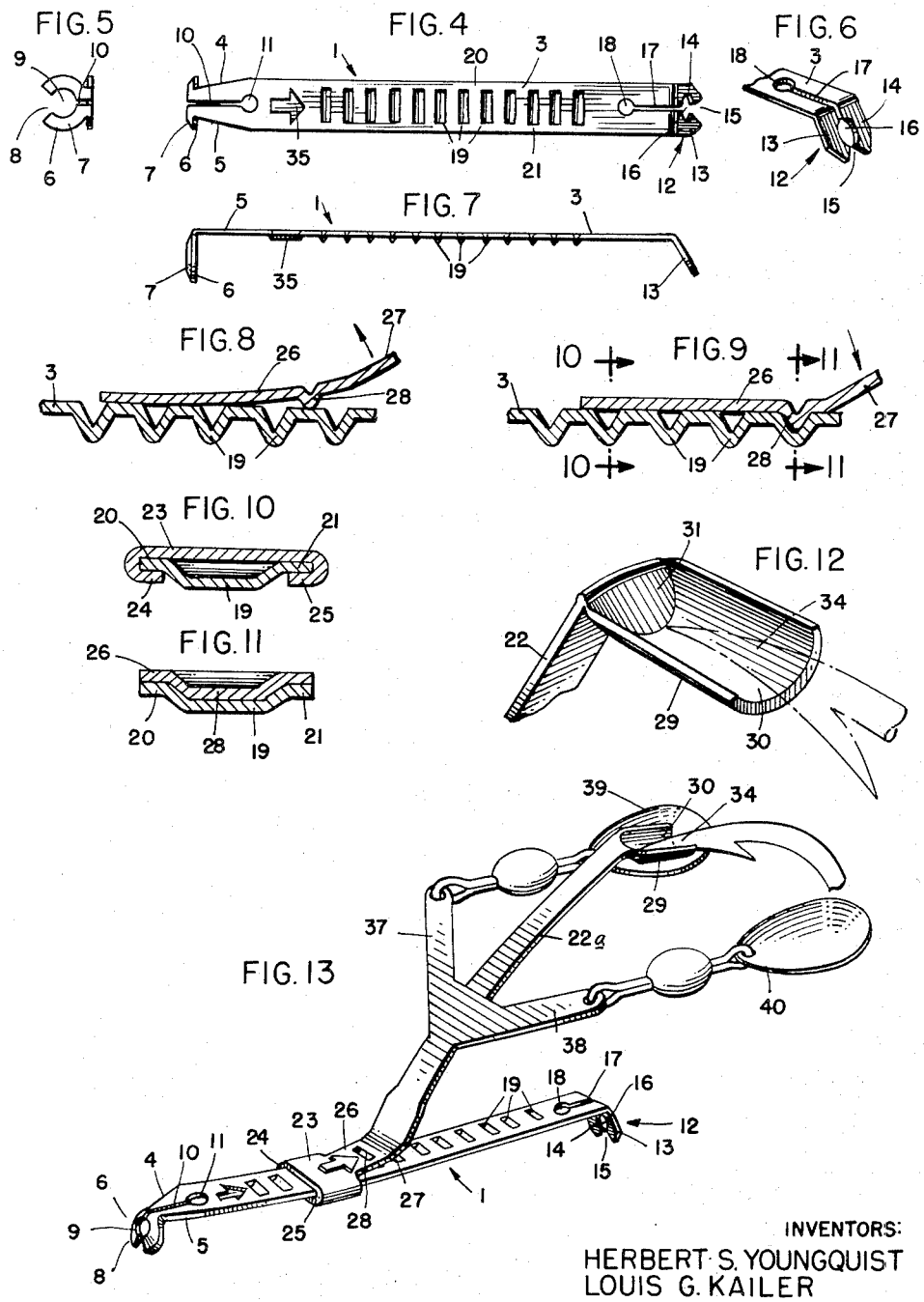

ent embodying the present invention;

United States Patent Office 2,785,498
Patented Mar. 19, 1957

2,785,498

WEEDLESS ATTACHMENT

Herbert S. Youngquist and Louis G. Kailer, Evanston, and Harold W. Dahly, Chicago, Ill.

Application July 2, 1953, Serial No. 365,672

8 Claims. (Cl. 43—43.4)

This invention relates in general to improvements in weedless fish hooks and is particularly directed to a weedless attachment which may be attached to and detached from a fish hook for the purpose of preventing the hook from being caught on weeds.

Weedless fish hooks have been used heretofore but up to the present time have consisted primarily of devices which are permanently attached to the hook so that if the resilient wire or other such device which protects the sharp end of the hook from weeds should become broken, it is necessary to replace the entire hook.

Furthermore, the weedless hooks heretofore known may be purchased in various sizes as unitary structures so that when one is broken the entire hook and weedless portion thereof of the same size must be replaced.

It is therefore one of the principal objects of the present invention to provide a weedless attachment for fish hooks which is designed to overcome all of the disadvantages mentioned above and which are inherent in weedless hooks of the type presently in use.

Another object of the invention is to provide a weedless attachment for fish hooks which is quickly and easily attached to and removed from an ordinary hook.

A further object of the invention is to provide a weedless attachment for fish hooks which is adjustable and may be used with many different sizes of hooks.

Still another object of the invention is to provide a weedless attachment for fish hooks which is detachable from the hooks, is adjustable for use with different size hooks, and wherein suitable means are provided to effectively lock the attachment at its adjusted position while in use.

A still further object of the invention is to provide a weedless attachment wherein the guard member which guards the sharp end or point of a fish hook is freely adjustable along the length of a support so that the attachment may be used with different size hooks and yet which may be effectively locked in its adjusted position when in use.

Another object of the invention is to provide a weedless attachment which includes two main parts, one of which forms a support which may be quickly and easily attached to and removed from the hook and the other of which forms a guard which is slidably mounted on the support and wherein the support is provided with a series of indentations to receive a corresponding detent on the guard to lock the two parts together while the attachment is in operative position and after adjustment for the size of the hook.

Still another and more specific object of the invention is to provide a weedless attachment which is adjustable for different size hooks and wherein one end thereof is adapted to abut the eye of the hook and the other end thereof is designed so as to partially conceal and protect the point of the hook and to have a bearing surface adapted to exert a force on the point of the hook in a direction opposite to the force of the said one end against the eye of the hook.

Other objects and advantages of the invention will become apparent upon reading the following description taken in conjunction with the accompanying drawings in which:

Fig. 1 is a perspective view of the weedless attachment embodying the present invention;

Fig. 2 is a perspective view of the attachment shown in Fig. 1 but illustrated as applied to a hook;

Fig. 3 is a view similar to Fig. 2 but showing the attachment in operative position;

Fig. 4 is a plan view of the support member of the attachment;

Fig. 5 is an end elevational view showing the front end of the support shown in Fig. 4;

Fig. 6 is a fragmentary perspective view of the rear end of the support member;

Fig. 7 is a side elevational view of the support member;

Fig. 8 is a somewhat enlarged fragmentary longitudinal sectional view through the assembled attachment showing the relative position of the parts during adjustment and prior to being placed in operative position;

Fig. 9 is a view similar to Fig. 8 but illustrating the parts when in operative position;

Fig. 10 is a transverse sectional view of the attachment taken along the plane of line 10—10 of Fig. 9;

Fig. 11 is a transverse sectional view taken along the plane of line 11—11 of Fig. 9;

Fig. 12 is an enlarged fragmentary perspective view of the free end of the guard member illustrating the preferred form of recess which partially conceals and protects the sharp end of the hook; and Fig. 13 is a perspective view similar to Fig. 1 but showing a modified form of the attachment.

The weedless attachment embodying the present invention may be described briefly as comprising an elongated support member which is so formed as to be able to be attached to and detached from the shank of an ordinary fish hook. The support itself is adjustable by being slidable along the length of the shank. The other member of the attachment may be termed a guard member and is mounted for sliding movement along the length of the support. This guard member is flexible and extends upwardly and rearwardly of the support member toward the sharp end of the hook. Normally the guard will extend to a point above the hook end but may be forced downwardly to a point below and in contact with the point of the hook whereby the concave end thereof may receive the hook end and guard it from becoming entangled with weeds.

The length of the support has a plurality of indentations adapted to receive a detent on the guard member thereby to lock the guard member against movement with respect to the support when the guard has been forced downwardly to its operative position.

Referring now more particularly to the drawings, the support member is indicated generally by the numeral 1 and the guard member is indicated generally by the numeral 2. The support 1 includes an elongated main body portion 3, the edges of which at its forward end converge toward each other as indicated at 4 and 5. The extreme forward end is then bent downwardly as at 6 at substantially right angles to the main body portion 3. This down-turned portion 6 is preferably arcuate in form and the forward surface thereof is somewhat rounded or bullet-nosed as at 7. This forward down-turned end consists of two side members terminating short of each other at their lower ends to provide a space 8 therebetween and an opening 9 whereby to receive the shank of a hook.

A slot 10 extends from the opening 9 rearwardly for a short distance to another opening 11 in the main body 3 whereby the spaced sides comprising the forward end of the support 1 may be permitted to spring apart during attachment to or removal from a hook shank and thereafter close so that the forward end of the support may be loosely attached to the hook.

The rear end of the support 1 is indicated generally by the numeral 12 and is illustrated as being bent downwardly and rearwardly at an angle so that less resistance will be encountered as the device moves through the water. Referring to Fig. 6, it will be noted that this rear end portion consists of the spaced sides 13 and 14 which terminate short of each other at their outer ends to provide a space 15 communicating with an opening 16. A slot 17 then extends forwardly from the opening 16 to a second opening 18 in the main body portion 3 to enable the two side members to be spread apart when being applied to or removed from the shank of the hook.

At this point it may be observed that the support 3 has front and rear down-turned portions with openings therein to receive the shank of a hook whereby it may be quickly and easily applied thereto or detached therefrom. The front downturned end 6 is rounded or bullet-nosed to decrease the resistance thereof to the water through which it is moving and the rear end 12 is bent downwardly and rearwardly at an angle for the same purpose.

A plurality of indentations 19 are provided throughout a portion of the length of the main body 3 as may be seen in most of the figures, and particularly in Fig. 4. The number and spacement of these indentations obviously may be varied without departing from the spirit of the invention. In actual practice these indentations are approximately 1/16 of an inch apart. The indentations 19 occupy only a portion of the width of the support thereby providing the opposed smooth edge portions 20 and 21 which act as a track along which the guard member 2 is adapted to slide.

The guard member 2 consists essentially of a main elongated body portion 22 provided at one end thereof with a relatively wide section 23 providing ears 24 and 25 which are bent downwardly and inwardly toward each other thereby to form opposed recesses for receiving the tracks 20 and 21 of the support 1.

The main body 22 then extends outwardly from the portion 23 for a short distance as indicated at 26 and is positioned at a slight angle upwardly, as may be seen in Figs. 1, 2 and 8. The body 22 then continues in a flat section 27 which extends upwardly at a somewhat greater angle, as may be clearly seen in Figs. 1, 2, 8 and 9. A detent 28 is positioned in the section 26 of the guard member immediately forwardly of the section 27. The indentations 19 extend downwardly from the upper surface of support 1 and the detent 28 likewise extends downwardly and is adapted to be received in a corresponding indentation 19 when the attachment is in operative position. It is to be noted, however, that the length of section 26 and the positioning of the detent 28 adjacent the outer portion thereof is such that as the guard member is moved along the length of the support, the detent 28 will drop a short distance into successive indentations 19. When, however, the outer end of guard member 22 is pressed downwardly and held in that position, a sufficient force will be exerted to maintain the detent 28 in engagement with one of the indentations 19 and thereby prevent further movement of the guard member.

From the flat section 27 the guard member then extends upwardly and rearwardly and terminates at its upper end in a downwardly convex portion 29 providing a partially enclosed recess 30 having at its forward end a wall member 31. The hook itself consists of a shank 32 terminating at its forward end in an eye 33 and is curved upwardly and forwardly at its rear end to terminate in a pointed end 34. The recess 30 is adapted to be pressed downwardly to a point below the end 34 of the hook and when released will have sufficient force to press upwardly against the end 34 and receive the point of the hook. The structure is designed so that the sharp end of the hook will nest snuggly in the recess 30 and will preferably have the sharp point thereof abutting the wall 31.

It will be noted that the recess or concave portion 30 must be longer than the distance between adjacent indentations 19. The reason for this is that when the support 1 is applied to the shank 32 of the hook it will be moved forwardly so that the front end 6 thereof will abut the eye 33. Thereafter the guard member 2 will be moved along the length of the support and adjusted so that the recess 30 will be in a position to receive the end 34 of the hook. Depending upon the size of the hook, this position of the guard member may be such that the detent 28 may be located between adjacent indentations 19, as shown in Fig. 8. When the body portion 22 of the guard member is depressed and is allowed to move upwardly to the position shown in Fig. 3 where the recess 30 receives the end 34, the guard member 2 must then be moved either forwardly or rearwardly until the detent 28 is received in the next adjacent indentation 19. At this point the depressing of the body portion 22 of the guard member will exert a downward force on the detent 28 and the sections 26 and 27 adjacent thereto to lock the guard member in its adjusted position. This movement will also depress the main body 3 of the support 1, as illustrated in Fig. 3. Since the support is also flexible, there will be exerted an upward force of the support itself at the point where the section 23 receives the track portions 20 and 21 of the support. Also in this position the forward end 6 of the support is abutting the eye 33 and the sharp end 34 of the hook is abutting the wall 31 so that the entire attachment is locked not only to prevent movement of the guard member 2 with respect to the support 1, but also to prevent any movement of the support 1 with respect to the shank 32 of the hook.

The purpose of the converging forward edges 4 and 5 of the support 1 is to permit assembly and disassembly of the guard member 2 therewith. Since the ears 24 and 25 form recesses by extending toward each other, the guard member can not be applied to the support 1 by placing it over the rear end 12 due to the angular bend downwardly thereof. The converging edges 4 and 5 at the front end of the support will permit reception by the guard member of the forward end of the support. Thus it is possible to place the guard member in assembled relationship with the support only at one end thereof.

Obviously, there can be only one proper way to assemble the two parts of the device. However, the lower end of the guard member will be able to receive the forward end of the support either when the guard member is positioned as shown in Figs. 1, 2 or 3 or when the guard member is reversed and turned through 180°. If assembled in this way, however, the device would not be operative and it has therefore been deemed advisable to provide both the guard member and the support with indicia which would indicate the positioning of the two members for proper assembly. To this end an arrow or other suitable indicating means 35 is stamped in or otherwise applied to the forward end of the support 1 and a corresponding arrow or indicating means 36 is applied to the lower end of the guard member 2. If these indicia are stamped in their respective parts, as they are in the drawings, then it is advisable to stamp the arrow 35 in the support so that it extends downwardly and the arrow 36 in the guard member so that it extends upwardly thereby to prevent any interference between the two as the guard member is being applied to the support. Thus when the guard member is applied to the forward end of the support in a position where the two indicating means 35 and 36 point in the same direction, the assembly will be proper and the device will then be operative.

Fig. 13 illustrates a modified form of guard member which may be used with spinners. In this figure of the drawing the support 1 will be identical with that heretofore described and similar numbers have been applied thereto to indicate similar parts. The guard member, however, is modified and has a body portion indicated at 22a. Arms 37 and 38 extend angularly outwardly and rearwardly from the body portion 22a and may have attached thereto the spinners 39 and 40.

The modified form of the weedless attachment operates in the manner described above wherein the guard member may be depressed to a position where the recess 30 at the outer end thereof will receive the sharp end 34 of the hook to partially conceal and protect the hook from becoming entangled with weeds.

The two parts may preferably be formed of spring steel to require relatively little force to disengage the recess 30 from the end of the hook and yet which will maintain the parts in locked position during ordinary usage thereof.

From the foregoing description it will be evident that the weedless attachment embodying the present invention has many advantages over those heretofore known. For example, the same attachment may be utilized for many different size hooks within a wide range because of the adjustable feature of the guard member.

Furthermore, the fact that the attachment can be quickly and easily applied to and removed from a hook is advantageous from the standpoint that if one should become broken or lost, another can be applied to the same hook without making it necessary to purchase an entirely new hook, which must be done at the present time where the weed guard is formed as an integral part of the hook.

Changes may be made in the form, construction and arrangement of parts from those disclosed herein without in any way departing from the spirit of the invention or sacrificing any of the attendant advantages thereof, provided, however, that such changes fall within the scope of the claims appended hereto.

The invention is hereby claimed as follows:

1. A weedless attachment for fish hooks, comprising an elongated guard support said support being provided with means only at its ends engageable with a shank of a hook whereby the support is adapted to be removably mounted on the shank of the hook, an elongated guard member mounted at one end thereof on said support and adjustable longitudinally along the support, and means at the other end of said guard member adapted to receive and partially conceal the point of the hook.

2. A weedless attachment for fish hooks, comprising an elongated guard support adapted to be removably mounted on the shank of the hook, an elongated guard member mounted at one end thereof on said support and adjustable longitudinally of said support, means to lock the guard member in adjusted position to the support, and means at the other end of said guard member adapted to receive and partially conceal the point of the hook.

3. A weedless attachment for fish hooks, comprising an elongated guard support member adapted to be removably mounted on the shank of the hook, an elongated flexible guard member mounted at one end thereof on said support and adjustable longitudinally of said support, locking means to lock the guard in adjusted position on the support, said locking means including a detent on one member and depressions on the other member, said detent being adapted to be selectively received in one of said depressions and means at the other end of said guard member adapted to receive and partially conceal the point of the hook.

4. A weedless attachment for fish hooks, comprising a guard support having yieldable bifurcated portions at the ends thereof for attachment to and removal from the shank of a hook, an elongated guard member mounted at one end thereof on said support and adjustable longitudinally of said support, and means at the other end of said guard member adapted to receive and partially conceal the point of the hook.

5. A weedless attachment for fish hooks, comprising a guard support having spaced apart yieldable bifurcated portions thereon for attachment to and removal from the shank of a hook, an elongated guard member mounted at one end thereof on said support and adjustable longitudinally of said support, cooperating means on said support and said guard member to lock said guard member in its adjusted position, and means at the other end of said guard member adapted to receive and partially conceal the point of the hook.

6. A weedless attachment for fish hooks, comprising an elongated guard support, means on said support to removably receive the shank of a hook, a plurality of indentations in said support spaced longitudinally thereof, an elongated flexible guard member mounted at one end thereof on said support and adjustable longitudinally of said support, said guard member extending angularly upwardly away from said support and terminating normally above the point of the hook to which it is attached and being depressible to a position below the point, a detent in said guard member adapted to be received in one of said indentations when the guard member is depressed, thereby to lock said guard member in its adjusted position, and means on the outer free end of said guard member to receive and partially conceal the point of the hook.

7. A weedless attachment for fish hooks, comprising a guard support having spaced apart yieldable bifurcated portions thereon for attachment to and removal from the shank of a hook, an elongated flexible guard member mounted at one end thereof on said support and adjustable longitudinally of said support, cooperating means including a plurality of indentations on said support and a detent on said guard member adapted to be received by one of said indentations to lock said guard member in its adjusted position, and means at the other end of said guard member adapted to receive and partially conceal the point of the hook.

8. A removable weedless attachment for fish hooks comprising an elongated support detachably mounted on a fish hook shank, a guard member slidably adjustable along said support, one end of said guard member being formed over to receive said support, the other end of the guard member extending outwardly adjacent the barb of the hook, and interengaging means on the support and guard member to lock said members in adjusted position.

References Cited in the file of this patent

UNITED STATES PATENTS

| Number | Name | Date |
| --- | --- | --- |
| 379,080 | Rice | Mar. 6, 1888 |
| 734,544 | Hall | July 28, 1903 |
| 745,221 | Miller | Nov. 24, 1903 |
| 1,381,733 | O'Connor | June 14, 1921 |
| 2,087,369 | Woodring | July 20, 1937 |
| 2,090,571 | Coffin | Aug. 17, 1937 |
| 2,150,020 | Carlson | Mar. 7, 1939 |
| 2,539,605 | Bailey | Jan. 30, 1951 |
| 2,623,321 | Braukus | Dec. 30, 1952 |